United States Patent [19]
Nishio et al.

[11] Patent Number: 4,917,489
[45] Date of Patent: Apr. 17, 1990

[54] DEVICE FOR MEASURING SIZE OF LIGHT SPOT

[75] Inventors: Takashi Nishio, Koufu; Tomoyoshi Ikeya; Chiharu Koshio, both of Yamanashi, all of Japan

[73] Assignees: Pioneer Electronic Corporation; Pioneer Video Corporation, both of Yamanashi, Japan

[21] Appl. No.: 278,713

[22] Filed: Dec. 2, 1988

[30] Foreign Application Priority Data

May 19, 1988 [JP] Japan .............................. 63-66096[U]

[51] Int. Cl.⁴ .............................................. G01J 1/00
[52] U.S. Cl. ................................................... 356/121
[58] Field of Search ................ 356/121, 372, 225, 226

[56] References Cited
U.S. PATENT DOCUMENTS 4,160,598 7/1979 Firester et al. ...................... 356/121

FOREIGN PATENT DOCUMENTS 0151881 11/1979 Japan .................................. 356/121
0026458 2/1980 Japan .................................. 356/121
0179629 11/1982 Japan .................................. 356/121

Primary Examiner—F. L. Evans
Attorney, Agent, or Firm—Wegner & Bretschneider

[57] ABSTRACT

A light beam spot size measuring device comprises an optical magnifying system. The magnifying system receives an image of the recording light beam spot formed within an optical recording apparatus, and magnifies it. Then the converter receives the magnified image of the beam spot formed on the pickup surface thereof so as to produce an output signal representing the size of the beam spot. An attenuator device attenuates the intensity of the image of the laser beam spot during magnification. The image of the beam spot therefore can be currently measured on the basis of the output signal even with the high intensity of the recording light beam.

5 Claims, 3 Drawing Sheets

DEVICE FOR MEASURING SIZE OF LIGHT SPOT

BACKGROUND OF THE INVENTION

1. Field of the Invention

The present invention relates to a device for measuring a size of a light spot, and particularly to a device for measuring a size of a spot of a recording laser beam to be focused on an optical recording disk so as to make an information carrying disk such as a video disk, a compact disk etc. in an optical recording apparatus.

2. Description of the prior art

The width of each of the so-called pits formed on the information carrying disk should be less than approximately 0.5 $\mu$m. The diameter of the spot of the recording laser beam for forming pits on the optical recording disk is therefore adjusted to a length less than 0.5 $\mu$m in the optical recording apparatus. The size of the spot of the recording laser beam is determined by a wavelength $\lambda$ of the recording laser beam and a numerical aperture NA of the objective lens which focuses the laser beam on the optical recording disk in the optical focusing system of the optical recording apparatus. It is however usually difficult to accurately realize a required size of the spot of the laser beam, because the wavelength $\lambda$ fluctuates and the numerical aperture NA and the aberrations of the lens in the optical focusing system distribute within the respective allowable ranges. The spot of laser beam actually appearing on the disk is therefore once measured by the beam spot size measuring device. Then, the optical focusing system of the optical recording apparatus is appreciated in view of the result of the measurement, and the optical focusing system is adjusted again as a whole so as to arrange the size of the spot of the laser beam at the required size.

A conventional light spot size measuring device comprises an optical magnifying system for magnifying in dimension an image of the light spot formed by the optical focusing system, and a video monitoring device including a camera tube receiving the magnified image on the pickup surface thereof, so that the size of the light spot can be measured on the basis of the output signal of the camera tube.

However, it has been still difficult to adjust the size of the beam spot within the required largeness by using such a conventional measuring device, because the output level of the camera tube is saturated due to the high intensity of the laser beam at the optical recording process.

SUMMARY OF THE INVENTION

The object of the present invention is to overcome such drawback encountered in the conventional spot size measuring device and to provide a device for measuring the beam spot size which can operate at a high accuracy in measurement even with the high intensity of the recording laser beam irradiated onto the optical recording disk.

A device for measuring a size of a light spot to be formed on a reference surface comprising: an optical magnifying system having a receiving surface to be aligned with said reference surface for magnifying an image of a light spot formed on said receiving surface; attenuating means for attenuating an intensity of the magnified image; a photo-electric converter for receiving the magnified and attenuated image so as to produce an electric signal representing the image; and means for measuring the largeness the image on the basis of said electric signal.

In other words, the beam spot size measuring device according to the present invention first magnifies an image of the beam spot formed by an optical focusing system. Then the photo electric converter receives the magnified image of the beam spot formed on the pickup surface so as to produce an output signal representing the size of the beam spot. The attenuator device attenuates the intensity of the image of the light beam passing during magnification.

DESCRIPTION OF THE PREFERRED EMBODIMENT

The embodiment according to the present invention is hereinbelow explained in detail while referring to the accompanying drawings.

Figure 1:
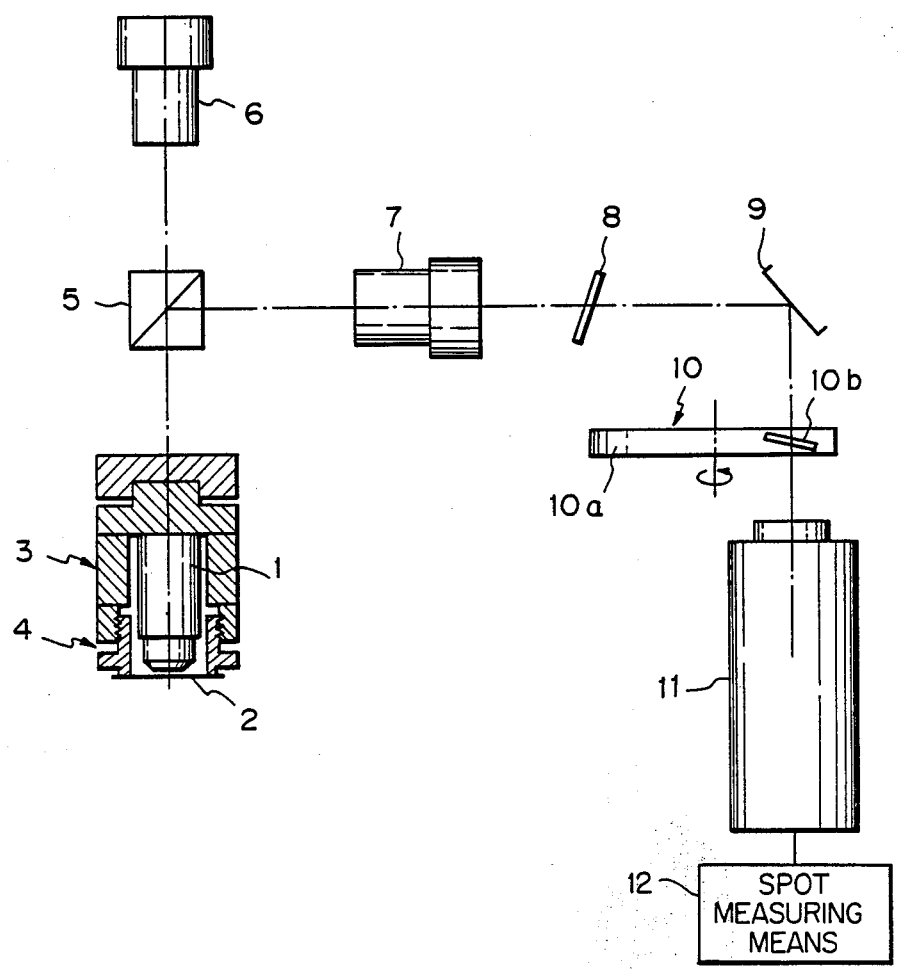
FIG. 1 is a schematic side view of an embodiment of the present invention.
Figure 2:
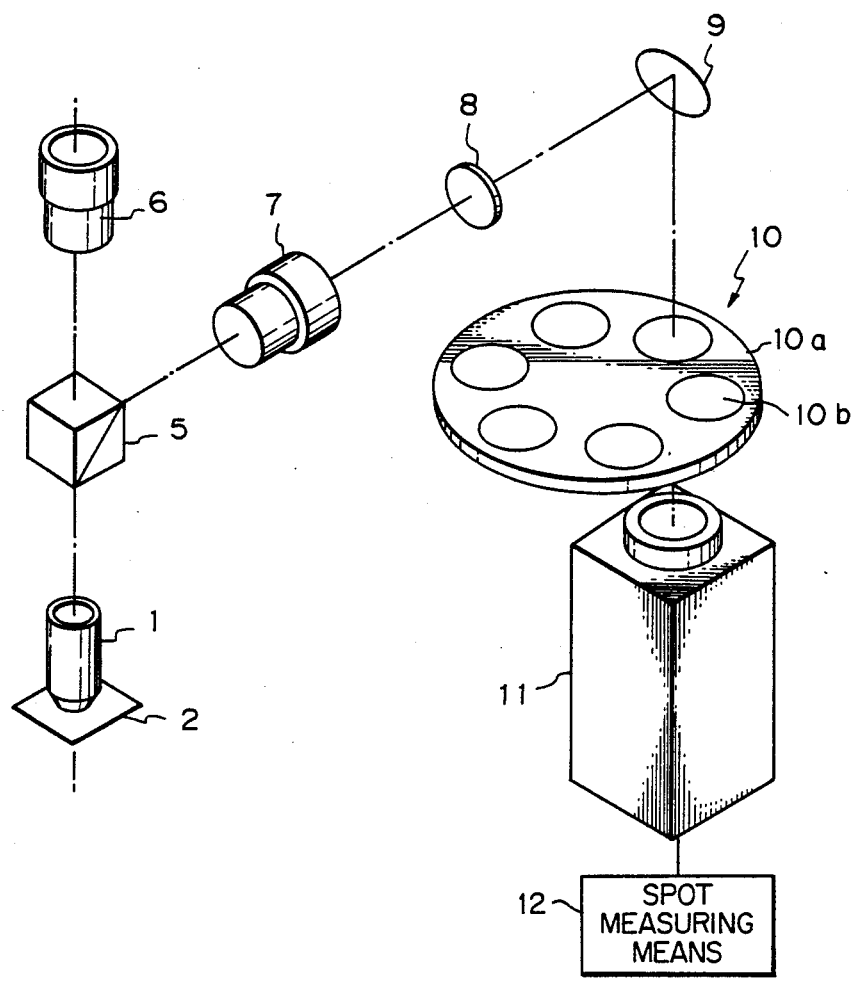
FIG. 2 is a perspective view of the device shown in FIG. 1.

The optical magnifying system shown in FIGS. 1 and 2 included in the embodiment comprises an oil immersion objective lens 1 as a magnifying lens whose numerical aperture NA is for example 1.25. A cover glass 2 whose thickness is for example 0.17 mm is disposed in the front of the objective lens 1 on the same optical axis. The gap between the objective lens 1 and the cover glass 2 is filled with oil. The relative distance between the objective lens 1 and the cover glass 2 along the optical axis is adjustable by means of an adjustment mechanism including a fine focus adjustment mechanism 3 having a piezoelectric element and a coarse focus adjustment mechanism 4 having a gearing mechanism. A metal thin film may be deposited on the cover glass 2 in order to obtain a pertinent reflectivity of the cover glass 2. The metal thin film is a receiving surface of the optical magnifying system for receiving the spot of the beam spot. The reflectivity of the cover glass 2 is necessary for the focus servo control of an optical focusing system in the optical recording apparatus, the optical focusing system being described hereinbelow. The optical focusing system concentrates a laser beam from a light source (not shown) so as to form an image of a beam spot on the cover glass 2 at the metal film-side thereof facing the optical focusing system. The metal thin film of the cover glass 2 is aligned with a reference surface on which a image of the beam spot should be imaged by the optical focusing system. This image of the beam spot is magnified through the objective lens 1. A portion of the laser beam passing through the cover glass 2 is separated by a beam splitter 5 into two components respectively introduced into a monitoring lens 6 and a relay lens 7. The laser beam passed through the relay lens 7 is attenuated down to the intensity of 0.1% by an attenuator 8 which is for example an optical filter consisting of the Inconel deposited N. D. filter (neutral density filter). The attenuator 8 is inclined with respect to the optical axis of the optical system in order to prevent the laser beam from returning back toward the source even through the beam is partly reflected at the attenuator 8. The attenuated laser beam passed through the attenuator 8 enters a reflecting mirror 9 at which the laser beam is reflected toward a variable attenuator 10. The variable attenuator 10 includes a disk member 10a carrying thereon six attenuation elements 10b in the main surface thereof, those elements having attenuation factors 100%, 20%, 10%, 2% and 1% respectively. Each of the attenuation elements 10b is inclined with respect to the optical axis of the optical system in order to avoid a reflected component thereat from returning toward the mirror 9. The attenuated laser beam passed through the variable attenuator 10 enters the pickup surface of a camera tube 11 so as to form the magnified image of the beam spot. The fine adjustment of the attenuation factor of the variable attenuator 10 is performed by determining the angular position of the disk member 10a in order to align a suitable one of the attenuation elements 10b to the optical axis for compensating fluctuations of the intensity or the wavelength of the laser beam generated from the light beam source such as an Ar or He-Ne laser. This optical magnifying system mentioned above is mounted on a carriage (not shown) so that the receiving surface i.e. the metal thin film of the cover glass 2 is placed at a reference surface at which the recording surface of the optical recording disk is to be exist.

Figure 3:
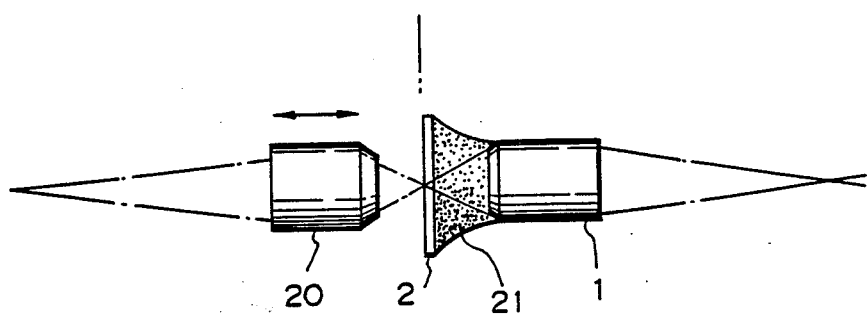
FIG. 3 is a view showing a relationship between the optical focusing system and the optical magnifying system included in the device of FIG. 1.

FIG. 3 shows the optical focusing system in the optical recording apparatus which comprises a focusing objective lens 20 for forming an optical image on the surface of the metal film of the cover glass 2, and the objective lens 1 in the optical magnifying system. The focusing objective lens 20 is disposed in front of the cover glass 2. The gap between the cover glass 2 and the objective lens 1 is filled with the oil 21. The focal length of the objective lens 1 is equal to the distance between the metal film of the cover glass 2 and the objective lens 1. Since the numerical aperture NA of the optical magnifying system is determined larger than that of the optical focusing system having a range of 0.75 through 0.95 of NA, the apparatus can avoid the adverse influence caused by the diffraction of the optical magnifying system and obtain an enlarged spot image similar to the spot of the laser beam on the cover glass 2. In the subject apparatus, the diffraction of the light beam is ignored on the optical axis because of the objective lens 1 dipped in the oil 21.

The magnifying power of the optical magnifying system is of approximately 1000 magnifications on the pickup surface of the camera tube, because that of the objective lens 1 is of 100 magnifications and that of the relay lens 7 is of 10 magnifications. The resolution of the measurement $\delta_m$ of the apparatus is preferably determined at approximately 0.01 $\mu$m, because the size of the spot of the recording laser beam is less than 0.5$\mu$ m. In the subject device, the resolution $\delta_o$ on the pickup surface of the camera tube 11 is calculated through the following equation:

$$\delta_o = 10 \text{ mm}/600 = 17 \ \mu\text{m}$$

wherein the horizontal resolution is equal to 600 lines and the horizontal scanning length H (the character H means a horizontal scanning time period) is approximately 10 mm. The resolution for measurement $\delta_m$ of the device is therefore equal to 1/1000 of the above resolution $\delta_o$.

$$\delta_m = 17/1000 = 17 \text{ nm} = 0.017 \ \mu\text{m}.$$

In this way, such a value of the resolution $\delta m$ for measurement suffices a preferred level.

In the subject device, a Chalnicon may be preferably used for the camera tube.

The Chalnicon has the following features:
(1) High sensitivity (it is about three times of that of a Vidicon.);
(2) Low dark current (it is about 1/20 of that of the Vidicon.);
(3) Image lag is low;
(4) Image burn is low; and
(5) Gamma property is an extent of 0.95 through 1.0 (That of the vidicon is 0.7.).

It is important that the Gamma property is very close to 1.0. The video signal generated from the camera tube 11 may be supplied to a CRT monitor, a wavelength monitor, a digital storage, a monitoring synchronous scope and an XY recorder which are collectively represented as spot measuring means 12 on FIGS. 1 and 2. The size or the spot of the laser beam is observed and measured by those measuring apparatus.

The operation of the spot-size measuring device mentioned above is explained hereinbelow. First, the distance between the objective lens 1 and the cover glass 2 is adjusted in the optical magnifying system. This fine adjustment of the objective lens 1 is performed until a small scratch less than 1 $\mu$m possibly formed on the surface of the cover glass 2 can be clearly observed through the monitoring lens 6.

The distance between the focusing objective lens 20 and the cover glass 2 is then adjusted in the optical focusing system. The coarse adjustment of the focusing objective lens 20 is performed until the image of the beam spot can be roughly observed through the monitoring lens 6. The fine adjustment of the focusing objective lens 20 is then performed until the magnified image of laser beam spot appearing on a CRT screen connected to the camera tube 11 becomes the smallest.

The measurement of the size of the laser beam spot should be performed while adjusting the state of the optical focusing system. The position of the focusing objective lens 20 should be controlled along the optical axis of the optical focusing system by watching the spot image via a pertinent monitoring means, because the focusing state possibly changes during the operation.

As mentioned above, the device for measuring the laser beam spot according to the present invention comprises the attenuating device for attenuating the intensity of the laser beam passing through the optical magnifying system. Therefore, the device can measure at a high accuracy the laser beam spot to be formed on the reference surface, i.e. the metal thin film even though the recording laser beam has a high intensity while preventing from damaging the photo-electric converter.

What is claimed is:
1. A device for measuring a size of a light spot formed on a reference surface comprising: an optical magnifying system having a receiving surface to be aligned with said reference surface and for magnifying an image of a light spot formed on said receiving surface; attenuating means for attenuating an intensity of the magnified image; a photo-electric converter for receiving the magnified and attenuated image so as to produce an electric signal representing the image; and means for measuring the size of the image on the basis of said electric signal.

2. A device according to claim 1, wherein said attenuating means is an optical filter.

3. A device according to claim 2, wherein said optical filter is inclined with respect to the optical axis of said magnifying system.

4. A device according to claim 3, wherein said attenuating means has a variable attenuation.

5. A device according to claim 4, wherein said attenuating means includes a plurality of attenuation elements having different attenuation factors and means for positioning one of said elements on the optical axis of said optical magnifying system.

* * * * *